United States Patent [19]

Chen

[11] Patent Number: 4,792,134
[45] Date of Patent: Dec. 20, 1988

[54] TREADMILL WITH IMPROVED ADJUSTING MECHANISM

[76] Inventor: Chao Y. Chen, No. 585, San-Feng Rd., Feng-Yuan City, Taiwan

[21] Appl. No.: 121,355

[22] Filed: Nov. 16, 1987

[51] Int. Cl.$^4$ .......................... A63B 23/06; F16H 9/12
[52] U.S. Cl. .......................................... 272/69; 474/27
[58] Field of Search ...................... 272/69, 97; 474/27, 474/89, 25, 26; 406/834, 835, 74

[56] References Cited

U.S. PATENT DOCUMENTS

| | | | |
|---|---|---|---|
| 2,727,398 | 12/1955 | Bowen | 474/27 |
| 2,969,768 | 1/1961 | Grant | 272/69 |
| 4,502,679 | 3/1985 | DeLorenzo | 474/27 |

*Primary Examiner*—Richard J. Apley
*Assistant Examiner*—S. R. Crow

*Attorney, Agent, or Firm*—Lowe, Price, LeBlanc, Becker & Shur

[57] ABSTRACT

A speed adjusting mechanism for adjusting the speed of an endless belt of a treadmill includes a speed variable V-belt drive mechanism which has two pairs of cone-shaped discs mounted coaxially on a transmission shaft disposed between an output shaft of a motor and a driven shaft of the treadmill belt. Each pair of discs includes a fixed disc and a slideable disc adjacent to the slideable disc of the other pair of discs, and the slideable discs slide mutually upon lateral displacement of the transmission shaft. The transmission shaft is displaced laterally by a reversible motor through a crank mechanism and a gear mechanism including a sector gear. The slope of the belt is adjusted by another reversible motor through a gear mechanism including a sector gear.

5 Claims, 7 Drawing Sheets

TREADMILL WITH IMPROVED ADJUSTING MECHANISM

BACKGROUND OF THE INVENTION

This invention relates to a treadmill and particularly to adjusting mechanisms for adjusting the rotative speed and the slope of an endless belt of the treadmill.

A machine denoted as a treadmill has been well known and widely used by many people. Today the treadmill is becoming increasingly popular as an exercise device due to the fact that the space for exercise activity in many cities is gradually decreasing. Ideally, this machine forces a person to move his or her legs at a rate which will prevent the person from being thrown off the exercise device. Typical exercise machines, of course, employ a complicated structure; however, such structure is either inaccessible or difficult to manipulate immediately, so as not to fulfill the requirements of the user.

It is known to provide adjusting mechanisms for adjusting the rotative speed and the slope of an endless belt of the treadmill. One of the known treadmill includes an adjusting mechanism which has a V-belt drive assembly operated by a reversible motor through a gear assembly. The V-belt drive assembly includes a pair of cone-shaped discs, one of the pairs being mounted on an output shaft of a driving motor and the other pair being mounted on a transmission shaft parallel to the output shaft. The pair of the discs mounted on the transmission shaft has a slideable disc which can be moved toward and away from an adjacent fixed disc by the operation of the reversible motor and a telescopic threaded sleeve which is extensible and retractable to move the slideable disc. The transmission shaft is associated operably with the driven shaft of the belt through a complicated gear assembly. The slope adjusting mechanism of this treadmill includes a linkage system which can be adjusted in height through a screw adjustment unit.

SUMMARY OF THE INVENTION

The main object of this invention is accordingly to provide an improved speed adjusting mechanism for the belt of a treadmill.

Another object of this invention is to provide an improved treadmill adaptable to adjust the slope of the belt easily.

This invention provides an improved speed adjustable driving mechanism which comprises: a driving motor having an output shaft; a driven shaft associated with the endless belt; a speed variable V-belt drive mechanism in connection with the output shaft and the driven shaft, the belt drive mechanism including a transmission shaft which is parallel to the output shaft and the driven shaft therebetween and which can be displaced laterally within a limited distance toward the output shaft or the driven shaft, two pairs of cone-shaped discs mounted coaxially on said transmission shaft, each of the pairs of the discs having a fixed disc and a slideable disc adjacent to the slideable disc of the other pair of the discs, the slideable discs sliding mutually upon displacement of the transmission shaft, a first pulley mounted on the output shaft, a second pulley mounted on the driven shaft, a first belt passing over said first pulley and one of the pair of discs, and a second belt passing over said second pulley and the other pair of discs; and means for displacing the transmission shaft, including a crank shaft in parallel with the transmission shaft, a crank arm interconnecting the transmission shaft and the crank shaft, a first reversible motor for driving the crank shaft, and a gear transmission mechanism interengaging the crank shaft and the first reversible motor.

The invention also provide a slope adjusting mechanism which includes: a pair of legs connected pivotally to a bottom side of the first portion of the base frame, a second sector gear having an arm operably associated with the legs and a curved toothed portion extending upwardly from the arm, a second reversible motor mounted on the first portion, a second gearing mechanism interengaging the second reversible motor and the second sector gear to hold adjustably the legs in a position forming an angle with the base frame and to move the second sector gear so as to vary the angle of the legs relative to the base frame.

BRIEF DESCRIPTION OF THE DRAWINGS

Those objects of this invention will become apparent from the following detailed description of the preferred embodiment in conjunction with the accompanying drawings, wherein.

DETAILED DESCRIPTION OF THE PREFERRED EMBODIMENT

Figure 1:
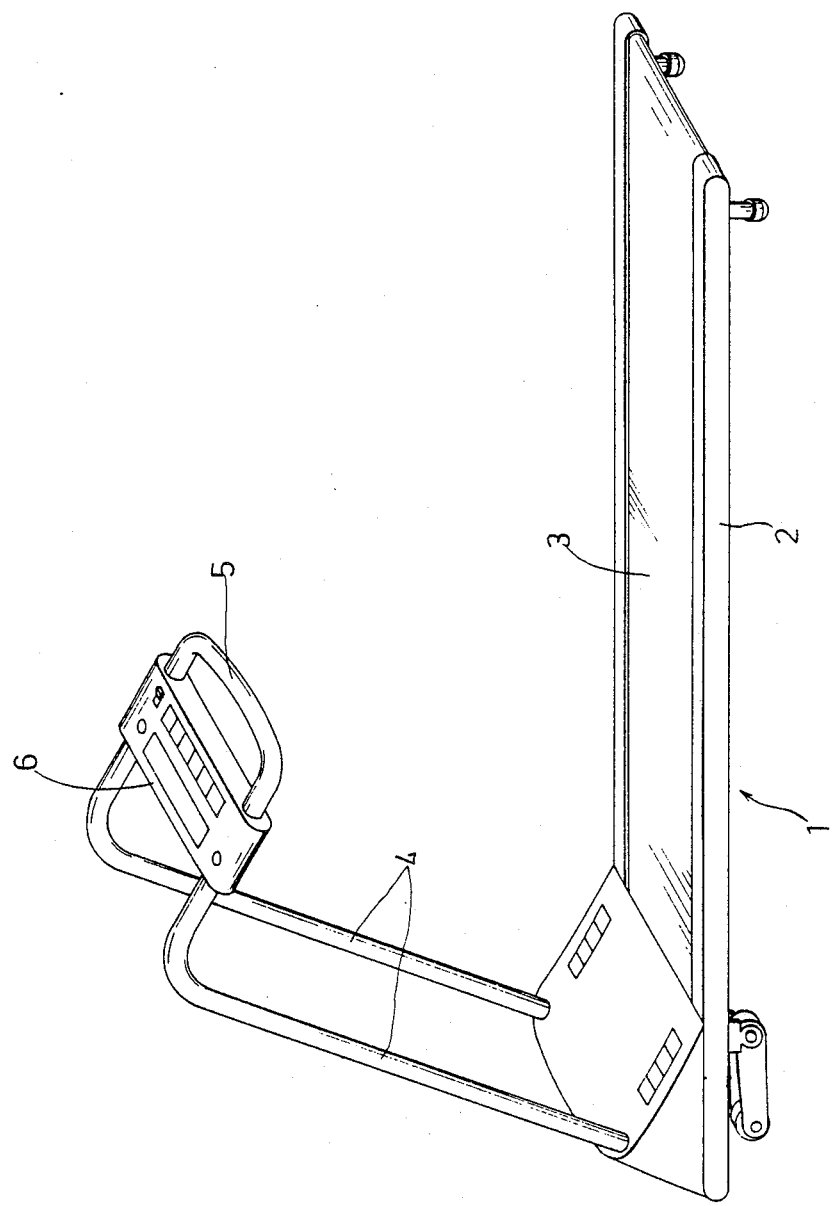
FIG. 1 is a perspective view of the preferred embodiment according to this invention.

FIG. 1 shows this invention as associated with a treadmill 1 having a base frame 2 on which an endless belt 3 is rotatably mounted. The base frame 2 has a pair of integral upright posts 4 secured thereto. An instrument 6 which has a display and a plurality of functions thereon for readily manipulating this machine and instantaneously realizing the status of the user himself, is mounted integrally between the upper ends of the posts 4 and a handle portion 5 is secured thereto.

Figure 2:
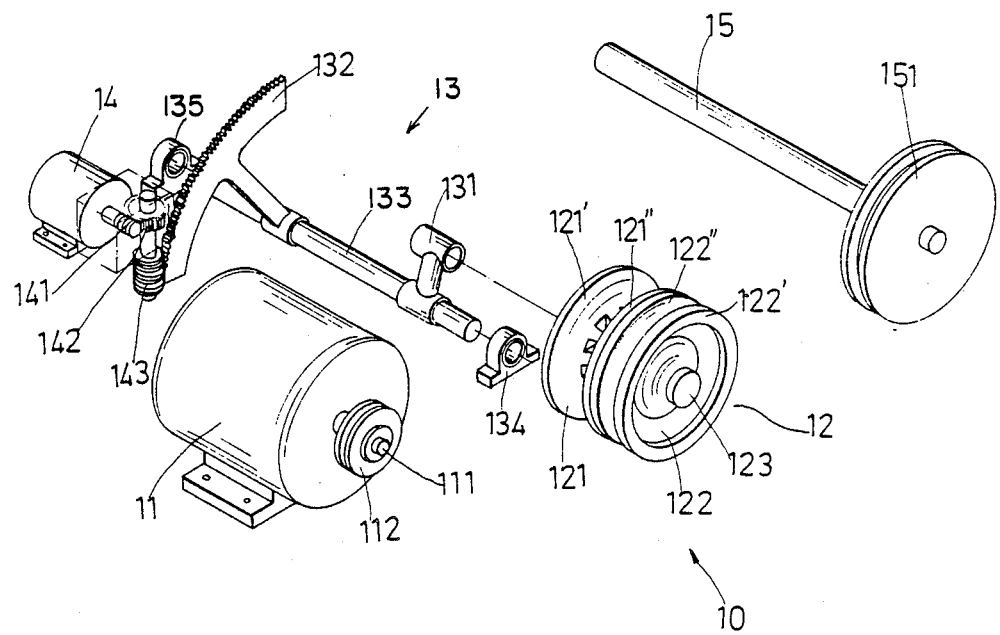
FIG. 2 is a perspective view of a speed adjustable mechanism according to this invention.

FIG. 2 shows a speed adjustable mechanism 10 mounted within the first portion of the base frame 2 for driving the endless belt 3 at a variable speed, including a drive motor 11 having an output shaft 111; a driven shaft 15 associated with the endless belt 3; a speed variable V-belt drive mechanism in connection with the output shaft 111 and the driven shaft 15, the belt drive mechanism 12 including a transmission shaft 123 which is parallel to the output shaft 111 and the drive shaft 15 and which can be displaced laterally, pulleys 112 and 151 mounted respectively on the shafts 111 and 15, two pairs of cone-shaped discs 121 and 122 mounted coaxially on the transmission shaft 123, each of the pairs of discs 121 and 122 having a fixed disc 121' or 122' and a slidable disc 121" or 122" adjacent to the slidable disc of the other discs, the slidable discs 121" and 122" sliding mutually upon displacement of the transmission shaft 123; and means 13 for displacing the transmission shaft 123, including a crank shaft 133 in parallel with the transmission shaft 123, a crank arm 131 interconnecting the transmission shaft 123 and the crank shaft 133, two seats 134 and 135 for mounting the crank shaft 133; a first reversible motor 14 for driving the crank shaft 133, and a gear transmission mechanism interengaging the crank shaft 133 and the first reversible motor 14.

The gear transmission mechanism includes a first sector gear 132 mounted on the crank shaft 133 and a first worm wheel 143 engaging with the sector gear 132, a gear 142 engaging with a gear 141 mounted on the first reversible motor 14.

Figure 3:
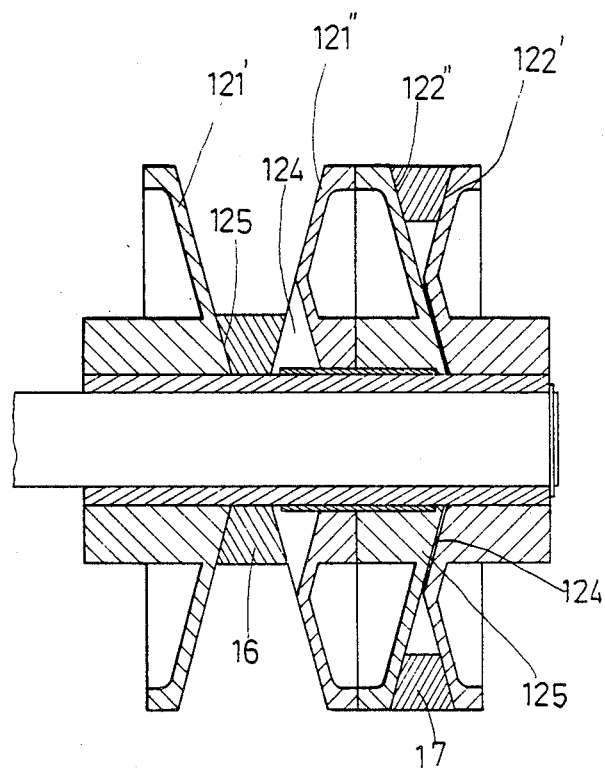
FIG. 3 is an elevation view showing a disc of this invention.
Figure 4:
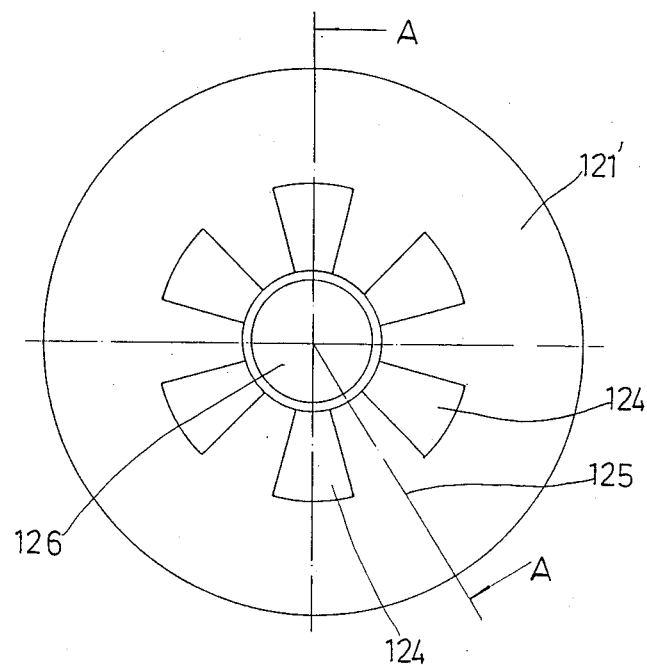
FIG. 4 is a cross-sectional side elevation view of the disc of this invention.
Figure 5:
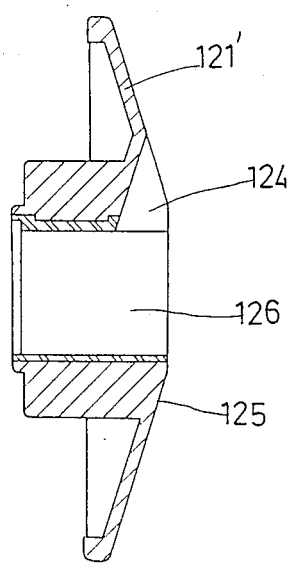
FIG. 5 is a cross-sectional side elevation view showing two pairs of cone-shaped discs mounted coaxially on a transmission shaft.

The fixed discs 121' and 122' and the slidable discs 121" and 122" are substantially in the same configuration. Referring to FIGS. 3, 4 and 5, each disc 121', 122', 121" and 122" includes a truncated cone-shaped surface having a plurality of angularly spaced engagement grooves 124 adjacent directly to a central through-bore 126 and extending radially on the surface. The slideable discs engages with the respective fixed discs by means of these engagement grooves when they approach the fixed discs.

Figure 6A:
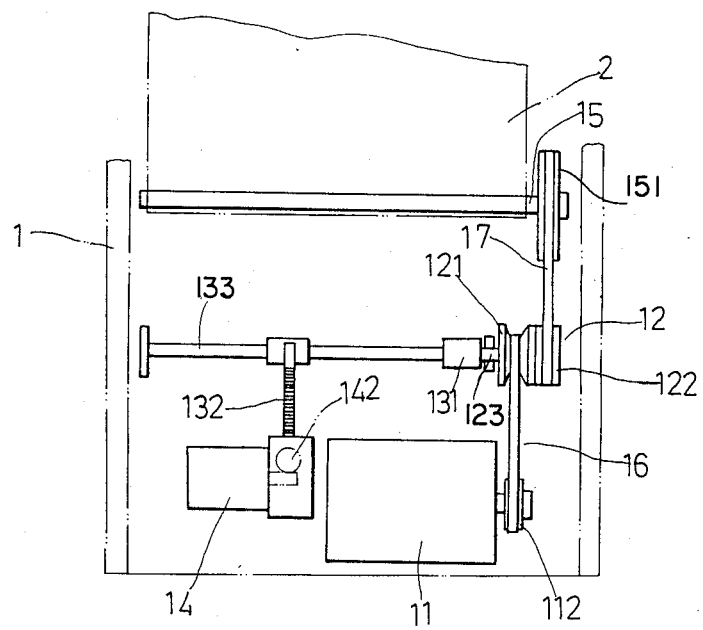
FIGS. 6A and 6B show top views of the speed adjustable mechanism in operation, respectively.
Figure 6B:
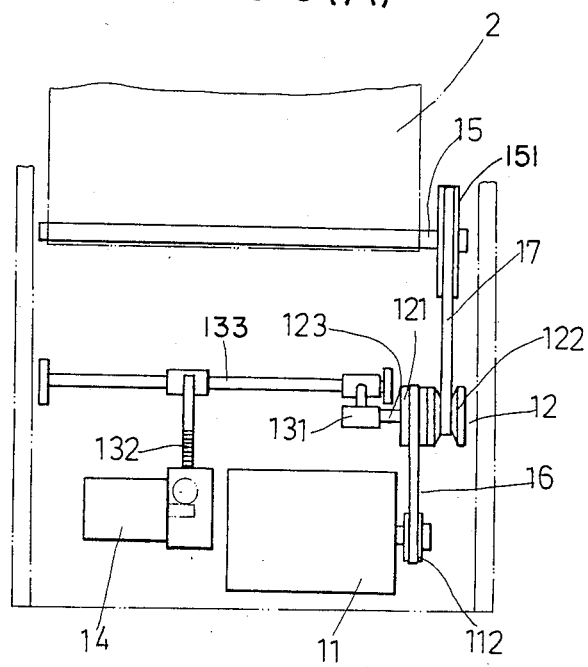

FIGS. 6A and 6B show the speed adjustable mechanism 10 in operation. Belts 16 and 17 are arranged to pass over the pulleys 111, 151 and the pairs of the discs 121 and 122. The slideable discs 121" and 122" are urged towards the fixed disc 122' over the force exerted by the belt 16 and the disc 122" is engaged with the disc 122' by means of the grooves 124 when the motor 14 is operated to cause the shafts 133 and 123 to be aligned horizontally as shown in FIG. 6A. This action results in an increased distance between the transmission shaft 123 and the belt 17, thereby increasing the speed of the driven shaft 15. When the shaft 123 is moved downward relative to the shaft 133, the rotative speed of the shaft 15 is decreased due to the operation of the belts 16 and 17 and the discs 121 and 122 as shown in FIG. 6B.

Figure 7:
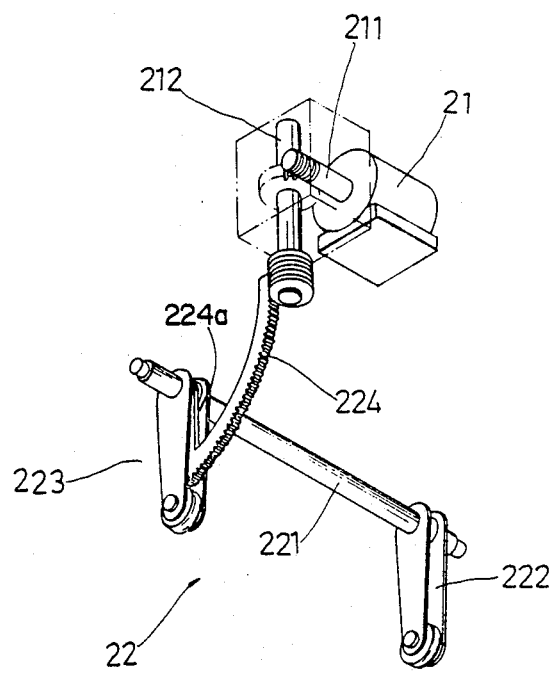
FIG. 7 is a perspective view of a slope adjustable mechanism of this invention.
Figure 8:
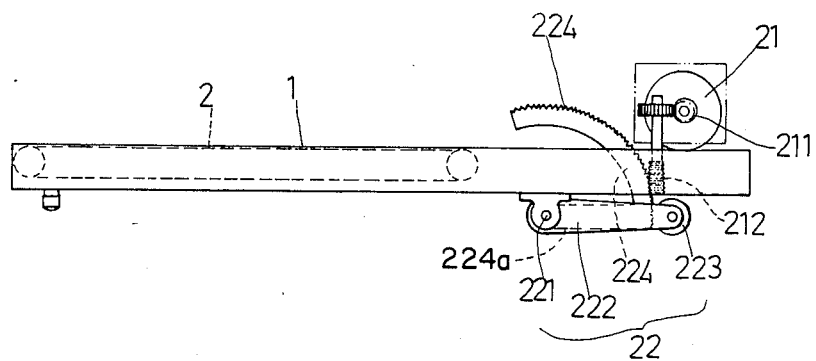
FIG. 8 is a side view showing that the base frame is horizontal.
Figure 9:
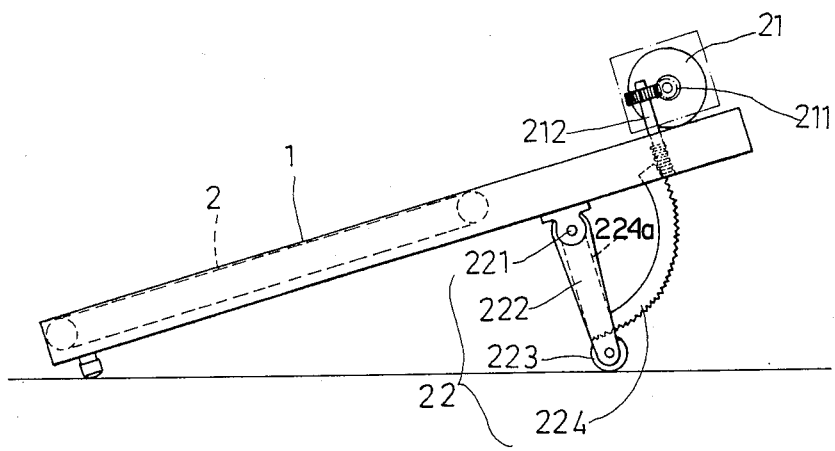
FIG. 9 is a side view showing that the base frame is inclined upwardly.

FIGS. 7, 8 and 9 show a slope adjustable mechanism 22 mounted below the base frame 1 to vary the slope of the base frame 2, which includes a pair of legs 222 and 223 connected pivotally to the first portion of the base frame 2 by means of a pivot shaft 221, a second sector gear having an arm 224a mounted together with the leg 223 and a curved toothed portion 224 extending upwardly from the arm; a second reversible motor 21; a second gear mechanism including worm wheels 211, 212 to interengage the second reversible motor 21 and the second sector gear 224 so as to move the second sector gear 224 and holds adjustably the legs 222 and 223 in an inclined plane relative to the base frame 2.

When the sector gear is moved upwardly by operating the motor 21, the slope of the base frame 2 decreases. On the contrary, when the sector gear is moved downward as shown in FIG. 9, the slope increases.

While a specific embodiment of the invention has been shown and described in more detail to illustrate the application of the principles of the invention, it will be understood that the invention may be embodied otherwise without departing from the spirit and scope of this invention.

What is claimed is:

1. A treadmill having a base frame with a first and a second portion, an endless belt rotatably mounted on the base frame, a pair of upright posts each having an upper and a lower end, the upright posts being secured on the first portion of the base frame, an instrument mounted integrally between the upper ends of the posts, a handle portion secured to the instrument, a speed adjustable driving mechanism mounted within the first portion of said base frame for driving said endless belt at a variable speed, and a slope adjustable mechanism mounted below said base frame and being operative to vary the slope of the base frame, wherein said speed adjustable driving mechanism comprises:
    a driving motor having an output shaft;
    a driven shaft associated with said endless belt;
    a speed variable V-belt drive mechanism in connection with said output shaft and said driven shaft, said V-belt drive mechanism including a transmission shaft which is parallel to said output shaft and said driven shaft therebetween and which can be displaced laterally within a limited distance toward said output shaft or said driven shaft, two pairs of cone-shaped discs mounted coaxially on said transmission shaft, each of said pairs of said discs having a fixed disc and a slideable disc adjacent to said slideable disc of the other said pair of said discs, said slideable discs sliding mutually upon displacement of said transmission shaft, a first pulley mounted on said output shaft, a second pulley mounted on said driven shaft, a first V-belt passing over said first pulley and one of said pairs of cone-shaped discs, and a second V-belt passing over said second pulley and the other one of said pairs of said cone-shaped discs; and
    means for displacing said transmission shaft, including a crank shaft in parallel with said transmission shaft, a crank arm interconnecting said transmission shaft and said crank shaft, a first reversible motor for driving said crank shaft, and a gear transmission mechanism interengaging said crank shaft and said first reversible motor.

2. A treadmill as claimed in claim 1, wherein said gear transmission mechanism includes a first sector gear mounted on said crank shaft and first worm wheels interengaging said sector gear and said first reversible motor.

3. A treadmill as claimed in claim 1, wherein said slope adjustable mechanism includes;
    a pair of legs connected pivotally to a bottom side of said first portion of said base frame, a second sector gear having an arm operably associated with said legs and a curved toothed portion extending upwardly from said arm, a second reversible motor mounted on said first portion, a second gearing mechanism interengaging said second reversible motor and said second sector gear to hold adjustably said legs in a position forming an angle with said base frame and to move said second sector gear so as to vary said angle.

4. A treadmill as claimed in claim 3, wherein said second gearing mechanism includes interengaging worm wheels.

5. A treadmill as claimed in claim 1, wherein each of said fixed discs and said slideable discs have opposite truncated cone-shaped surfaces each of which has a plurality of angularly spaced apart and radially extending engagement grooves.

* * * * *